(No Model.)
H. C. STIFEL.
WATER FILTER.
No. 582,401. Patented May 11, 1897.
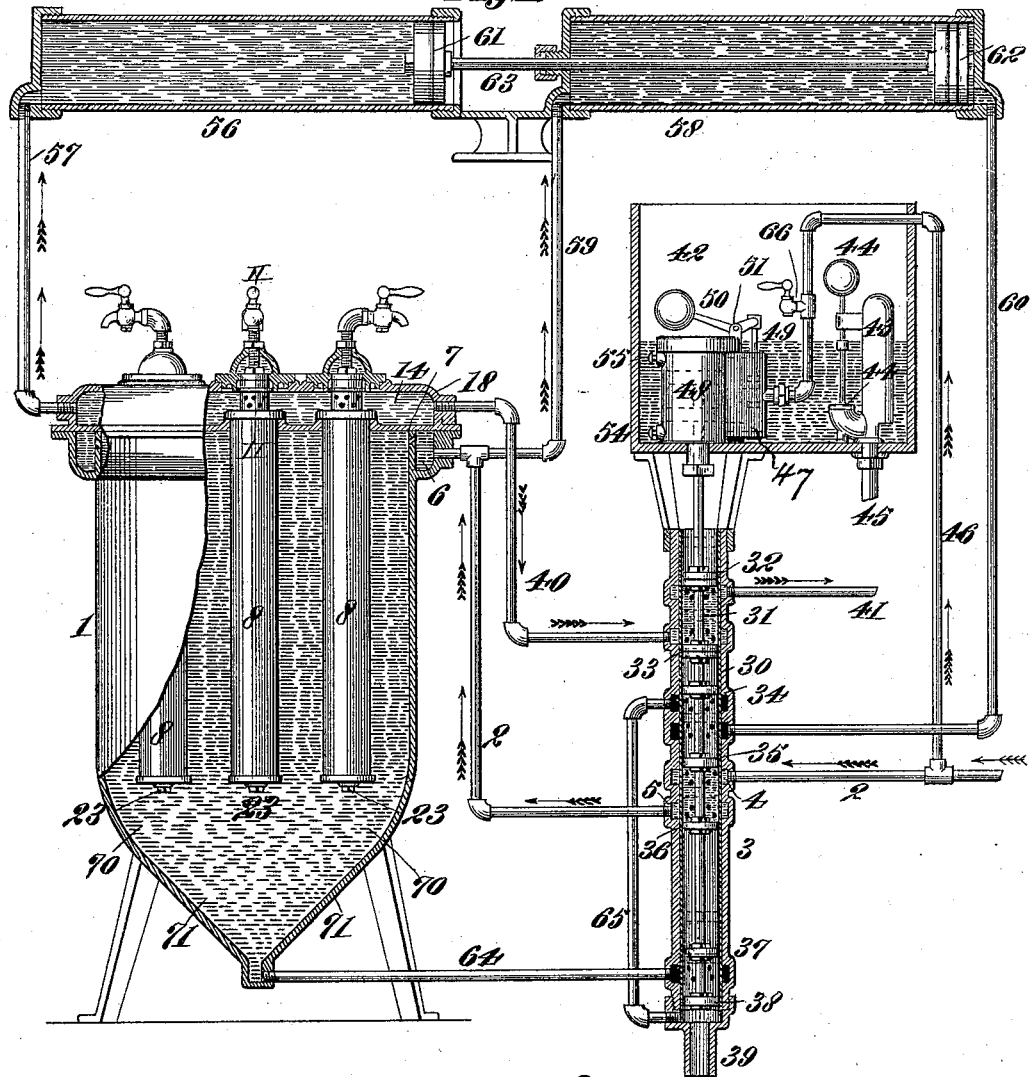
Fig. I.
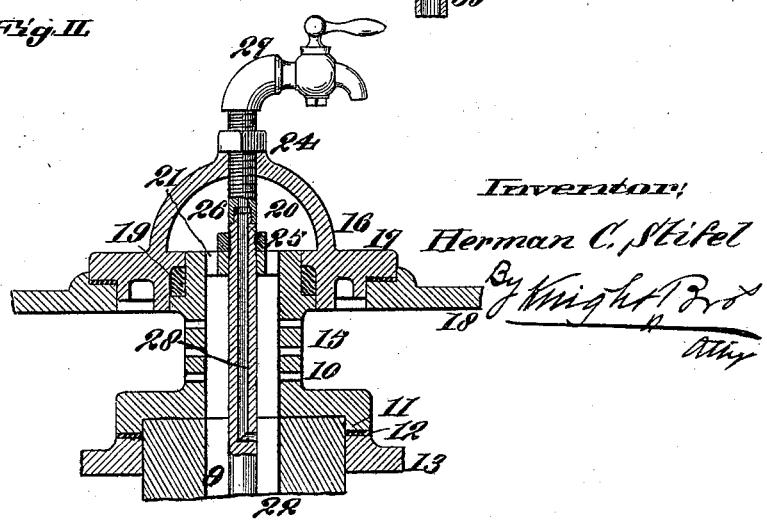
Fig. II.
Attest:
C. G. Edwards
E. L. Knight
Inventor:
Herman C. Stifel
By Knight Bros
Attys

UNITED STATES PATENT OFFICE.

HERMAN C. STIFEL, OF ST. LOUIS, MISSOURI, ASSIGNOR, BY MESNE ASSIGNMENTS, TO THE AMERICAN TRIPOLI COMPANY, OF CARTHAGE, MISSOURI.

WATER-FILTER.

SPECIFICATION forming part of Letters Patent No. 582,401, dated May 11, 1897.

Application filed July 16, 1894. Serial No. 517,638. (No model.)

*To all whom it may concern:*

Be it known that I, HERMAN C. STIFEL, of the city of St. Louis, in the State of Missouri, have invented a certain new and useful Improvement in Water-Filters, of which the following is a full, clear, and exact description, reference being had to the accompanying drawings, forming part of this specification.

My present invention relates to the class of filters shown and described in my application, Serial No. 502,350, filed March 5, 1894.

My present invention consists in features of novelty hereinafter fully described, and pointed out in the claims.

Figure I is a sectional view, part in elevation and illustrative of my invention. Fig. II is an enlarged detail section taken on line II II, Fig. I.

Referring to the drawings, 1 represents the filtering-tank.

2 is the supply-pipe, communicating with the filtering-tank through a valve device 3, the water passing from the city main or other supply into the valve device, as shown at 4, and from the valve device, as shown at 5, on through the pipe 2 into the filter, the pipe connecting with a chamber 6 at the upper end of the filter and passing through perforations 7 into the body of the filter outside of the filtering-stones 8. The water percolates through the stones to their hollow interiors 9 (see Fig. II) and passes upwardly into perforated sleeves or tubes 10, located on top of the stones and having downturned flanges 11 embracing the upper ends of the stones.

12 represents gaskets between the sleeves 10 and the bottom 13 of a clear-water chamber 14, located over the filtering-tank and forming the top to the tank. As stated, the sleeves 10 are provided with perforations 15, through which the water passes from the stones into the clear-water chamber 14. Above each sleeve 10 there is a cap 16, with a gasket 17 between it and the top 18 of the chamber 14 and also with a gasket 19 between it and the upper end of the sleeve 10. Each cap 16 has a chamber 20, into which filtered water passes through perforations 21 in the upper end of the sleeve 10. The caps are held in place and the stones are also supported by rods 22 passing through the caps and down through the sleeves 10 and through the stones 8. The rods have nuts 23 on their lower ends beneath the stones, and they are also provided with nuts 24 above the caps 20 and with nuts 25 over the upper ends of the sleeves 10. I prefer to form the rods in two sections each, tapped together at 26. On the upper end of each rod 22 is a petcock 27, and the upper end of each rod is formed with a port or passage 28, extending from the top down and below the upper end of the stone, where it is extended laterally to the side of the stone, so as to communicate with the interior of the stone. By the use of these ports or passages 28 and the petcocks 27 any stone which is not working properly or which has become cracked or broken, so as to admit unfiltered water, can be readily detected, as by opening the petcocks water will pass from the interior of the stones, and if the water from either is found to be dirty or not clear it is evidence that the stone requires attention or to be replaced.

The stones are individually removable by simply taking off the petcocks, separating the rods at 26, and removing the caps, which permits the sleeve 10 and the stone to be drawn out vertically through the opening closed by the cap.

The valve device consists of a cylinder or tube 30, within which is a rod 31, provided with valves or pistons 32, 33, 34, 35, 36, 37, and 38. The lower end of the pipe or cylinder 30 communicates with a waste-pipe 39.

40 is a pipe leading from the clear-water chamber 14 to the valve device between the valves 32 and 33 when the device is in filtering position, the water leaving the valve device through a pipe 41, which conducts it to the building or to a clear-water tank. (Not shown.)

42 represents a tank within which is a siphon 43, provided with an ordinary float and valve 44. The siphon communicates with a pipe 45, leading to the waste-pipe 39 or other point of discharge.

46 represents a pipe leading from the supply-pipe 2 into the valve-chest 47 of a cylinder 48. The valve of the chest 47 is provided with a stem 49, connected to a float 50, the stem of which is pivoted at 51 to the head of the cylinder 48. Within the cylinder is a piston connected to the stem or rod 31. The cylinder 48 is provided with a lower vent 54 and an upper vent 55, leading from the cylinder into the tank 42.

56 represents a clear-water tank or cylinder communicating at one end through means of a pipe 57 with the clear-water chamber 14.

58 represents a cylinder connecting at one end with the tank 1 or with the chamber 6 through means of a pipe 59 and connecting at the other end through means of a pipe 60 with the chamber in the valve device between the valves 34 and 35 when the parts are in filtering position.

61 represents a piston in the cylinder 56, and 62 a piston in the cylinder 58, these pistons being connected by a rod 63.

64 represents a pipe connecting the lower end of the filtering-tank 1 with the chamber or space between the valves 37 and 38 when the parts are in filtering position, and 65 represents a pipe connecting the space between the valves 34 and 35 (when the parts are in filtering position) with the waste-pipe 39.

The operation of the device is as follows: The parts being in the position shown in Fig. I, water will pass through the supply-pipe 2 and valve device 3 into the upper end of the filtering-tank, and passing through the stones enters the chamber 14 and passes through the pipe 40, through the valve device, and through the pipe 41 to the building or to the clear-water tank. A portion of the water passing through the pipe 2 goes on up through the pipe 59 and enters the inner end of the cylinder 58, moving the pistons 61 and 62 to the position shown in Fig. I, and a portion of the water passing through the filtering-stones enters the cylinder 56 through the pipe 57. The parts remain in this position for a time, and while they do the filtered water is passing through the pipe 40 and 41 to the place of storage or use, and while this operation is going on water is passing from the pipe 46 and dripping therefrom into the tank 42 through a valve 66 or through some other suitable passage or drip. This operation continues until the water in the tank 42 reaches the float 50 and moves the valve in the chest 47, permitting water to pass from the pipe 46 beneath the piston in the cylinder 48. This raises the stem 31 and the valves or pistons connected therewith, leaving the valves in the position shown by dotted lines in Fig. I, thus shutting off the pipe 2 from the tank 1 and shutting off the pipes 40 and 41 and opening a communication between the pipe 2 and the pipe 60 and also opening a communication between the tank 1 and the waste-pipe 39 through the pipe 64. As soon as this occurs water passing through the pipe 2 and through the pipe 60 forces the pistons 62 and 61 back to the other end of their cylinders and forces the clear water from the cylinder 56, through the pipe 57, back through the filtering-stones and out through the pipe 64 to the waste, and the water in the cylinder 58 passes through the pipe 59 and out to the waste-pipe through the pipe 64, washing the exterior of the stones. This operation consumes a few seconds, and as soon as the water in the tank 42 rises to the float 44 the siphon 43 is opened and the water wastes from the tank 42, and the valve in the chest 47 will be sent back to its original position by the weight of the float 50, and the piston in the cylinder 48 will descend, moving the valves on the stem 31 back to their original positions, when the filtering process will resume, the cylinders 56 and 58 filling again with water, as described, and the pistons 61 62 moving back to the position shown in Fig. I, and as they thus move back the water escapes from behind the piston 62, through the pipe 60, through the chamber between the valves 34 and 35, and through the pipe 65 to the waste-pipe. This operation is entirely automatic and is much the same as the operation of the device shown and described in my application referred to, the cleaning of the stones and flow of water back through the pipe 49 being effected by the city or supply pressure in the pipe 2. The device of my present invention differs from that of the application mentioned in features which are pointed out in the claims.

The lower end of the filtering-tank 1 is internally formed with concave portions 70 and sloping portions 71. The object of this particular shape is to insure the washing of the sediment from the lower end of the interior of the tank by the water passing back through the stones and back through the pipe 59 when the cleansing process is in operation, and it has been found in practice that by this particular shape the sediment is washed completely out of the tank, whereas with other forms or shapes it has been found that a portion of the sediment will adhere to the sides of the lower end of the tank and not be removed.

By providing separate cylinders 56 and 58, with no communication between them, there is no possibility of unfiltered water from the cylinder 58 passing into the clear-water cylinder 56.

I claim as my invention—

1. In a water-filter, the combination of a filtering-tank, a valve device, and means for forcing filtered water back through the filtering-tank, consisting of two independent cylinders provided with connected pistons, one of said cylinders communicating at both its ends with the supply-pipe and under control of the valve device and the other with the clear-water side of the filtering-tank; substantially as set forth.

2. The combination of a filtering-tank, a clear-water cylinder communicating with the filtering-tank, and provided with a piston, a cylinder communicating with the filtering-tank outside of the filtering-stones, and provided with a piston, a rod connecting said pistons, a supply-pipe, a valve device, a pipe connecting the valve device with the last-mentioned cylinder, and means for moving the valve device, whereby a communication is established between the last-mentioned pipe and the supply-pipe; substantially as and for the purpose set forth.

3. The combination of a filtering-tank, a clear-water cylinder communicating with the tank inside of the filtering-stones, and provided with a piston, a second cylinder provided with a piston connected to the piston of the first-mentioned cylinder, a supply-pipe, a valve device, pipes connecting the respective ends of the last-mentioned cylinder through the valve device to the supply-pipe and means for moving the valve device to open a communication between the supply-pipe alternately with opposite ends of the last-mentioned cylinder substantially as set forth.

4. In a filter, the combination of unfiltered and filtered water chambers two independent cylinders having pipe connection with the respective chambers of the filter and having their pistons connected, pipes also connecting both ends of the unfiltered-water cylinder with the source of supply, and means for directing pressure of said supply alternately on opposite sides of its piston first to charge the cylinders respectively with filtered and unfiltered water and then to force the same out to flush the filter both outside and through the stone, as explained.

5. In a water-filter, the combination of a filtering-tank, stones located within the tank, perforated sleeves on the upper ends of the stones, removable caps over the stones, rods passing through the caps and stones, and holding them in place, and petcocks on the upper ends of the rods; said rods being provided with ports or passages 28 leading from the petcocks into the upper ends of the stones; substantially as set forth.

HERMAN C. STIFEL.

In presence of—
E. S. KNIGHT,
C. G. EDWARDS.